Reissued July 23, 1940 Re. 21,513

UNITED STATES PATENT OFFICE 21,513

METHOD OF AND MATERIAL FOR INDIRECTLY PRODUCING COLOR PHOTOGRAPHS

Béla Gáspár, Brussels, Belgium

No Drawing. Original No. 1,956,017, dated April 24, 1934, Serial No. 514,706, February 9, 1931. Application for reissue April 18, 1936, Serial No. 75,245. In Germany March 1, 1930

27 Claims. (Cl. 95—2)

This invention relates to a method for the indirect production of color photographs.

It has already been proposed for the indirect production of color photographs to add leuco-bases to a silver salt emulsion, and to convert these into the particular color as a result of the interaction between the silver reduced upon the development and the leuco-bases, whereby the locally deposited quantity of silver in the developed picture determines the degree of color formation (including therefore the intensity of the color) for every point of the sensitized layer.

This method, however, has not been successful in view of the fact that the leuco-bases are very inconsistent, while the plates or papers are not capable of being stored for any length of time in their unexposed state, this also applying to the finished picture, as the resulting colors very easily diffuse and the colors which it has been proposed to employ are extremely unlasting, i. e., not fast.

According now to the invention, there are employed in place of the leuco bases the esters, ester salts or ethers of the leuco-compounds, or other equivalent colorless substances from which the dyes are derived.

In the process according to the invention silver salt emulsions will, generally speaking, also form the basis of operations, and for this reason these will be primarily referred to in the following.

For the purpose of converting the ester, etc., into the corresponding colors, the silver deposit of the developed picture is first converted into a compound which will act on the ester, etc. This compound may have an oxidizing, condensing, reducing or saponifying action, in accordance with the chemical nature of the color-forming substance employed.

According to a more recent invention, it is proposed with the assistance of esters or ester salts of the leuco-compounds to produce color-forming substances by the direct method effected by light. In this case the leuco-substances take the part of the sensitized substance, which part, in the present invention, is assigned to the silver salt (or more generally speaking, to the sensitized metallic salt). The new method with its subsequent conversion of the image, consisting of a metallic deposit, into a color image accordingly represents in face of the said direct method an indirect process. The invention covers a reaction in the dark and the known direct method a reaction under the effect of light.

To more clearly explain the invention, various examples are quoted in the following:—

In order, for example, to produce a blue picture diacetyl indigo white is incorporated in the silver emulsion and the sensitized layer is exposed, developed and fixed in the customary fashion. The leuco-substance in question, is not sensitive to the ordinary photographic baths employed, which condition, of course, requires to be observed not only in connection with the present example, but also in all other cases. The silver image produced is converted in the known manner into one consisting of an oxidizing compound, preferably into a lead chromate image. This is immersed in an acid solution, for example, a weak muriatic acid or sulphuric acid solution, whereupon the leuco-substance is converted into the desired color. The superfluous lead salt is thereupon removed, and the leuco-substance which has not been acted upon (at the unexposed or less exposed parts) treated with the known means (fixing salts and acetone).

The conversion of the leuco-substance into the dye represents in the example above described an oxidizing and at the same time also a saponifying process. If as an equivalent color-forming substance there is employed indoxyl sulphate of potassium or other salts of indoxyl sulphuric acid or analogous compounds, for example thionaphthenic acid, etc., indol or indol-carbonic acid and the lead chromate image is immersed in a hydroiodic acid solution, and thereupon in an alkaline solution, indigo is again formed by oxidation and condensation. If diacetylindigotine is employed as color-forming substance, and the silver image is converted into a ferrous iron salt image, indigo is formed by reduction.

As an example of the use of an insoluble ester salt and the formation of a red color, reference may be made to the cinchonic salt of the sulphuric acid ester from the leuco-compound 6.6′ dibrom-dimethyl-bis-thionaphthene-indigo. The silver developed from a layer containing this substance is converted in the known manner into peroxide of manganese, and the layer thereupon treated in an acid solution, the red color forming thioindigo rose. In similar manner it is also possible to employ the esters of other dyes, for example, helindon yellow, tetrabromide indigo, etc. Ethers of the leuco-compound of the dyes may also be employed, for example, ethyl ether of the hydroflavanthrene.

An additional example of conversion of the ester salts into the particular color at the points which have been subjected to exposure, or at certain points of the silver image resides in the following:—

The silver image is converted in the known manner into vanadyl-ferrocyanide, which acts as oxygen carrier, or catalyst respectively, and is subsequently converted into the particular color in a weak sulphate solution of potassium bromate or sodium chlorate. If desired, the conversion of the silver image into a color image may be performed with one single solution if the developed silver image is treated in a solution of certain oxidizing agents, for example potassium chlorochromate (or $\frac{1}{10}$% potassium bichromate + muriatic acid) or in a diluted potassium bromate solution, which is weakly acidified and contains a small amount of iodine potassium. Suitable leuco-substances are, for example, sulphate esters from the leuco-compounds of 6.6′ dibrom-dimethyl-bis-thionaphthene indigo and hexabrom-indigo. The use of these baths, or the conversion into the particular color respectively, may also be performed after the development and prior to the fixing.

The leuco-substances may also be converted into the particular colors at the points which have not been exposed, i. e. at the points which are free from metallic or silver deposit, by taking a diluted potassium bichromate solution which has been weakly acidified with sulphuric acid, dissolving the silver image at first formed, and thus again developing the remaining halogen silver and converting the silver image thus formed into the particular colour. However, it is also possible to convert a silver image containing a leuco-substance into an inverse image in direct fashion. In this connection a suitable leuco-substance will be found to exist, for example in sulphate ester of the leuco-compound of tetrabrom-indigo. This is treated in a solution as follows:—.1 g. potassium bichromate, .1 g. sodium chlorate, 1 cubic centimetre 20% sulphuric acid and 50 cu. cms. water.

An additional possibility resides in the use of water-soluble leuco-compounds, for example sodium salts of sulphuric acid esters from the leuco-compounds of indigoidal dyes. These are subsequently deposited in the layer in the form of insoluble cinchonine salts, or mixed with carrier colloids of that kind which greatly adsorb the salts, for example gelatine, collodion or cellulose ester.

The sulphate esters of the leuco compounds of vat dyestuffs have the property of impregnating the gelatine (for example the sodium salt of sulphate ester from the leuco-compound of hexabrom-indigo) so that the same cannot be removed by washing and may therefore also be incorporated in the gelatine without a fixing agent. The fixing is even better if at the same time there is added an organic acid, for example tartaric acid, or a tanning agent, such as chromium alum. The developer should be neutral as far as possible or responsive to a weak acid. In the present case the fixing agent requires to contain a substance, for example sodium carbonate, responding to alkali. By utilizing the said property of the sulphate ester the latter may be introduced into the layer prior to or following exposure and development, the layer being immersed in a solution of this ester or ester salts, or the substance applied to or pressed into the same. In the latter case, it is also possible to apply several different colors, for example in the manner of a screen, if necessary, mixed with filter colors and sensibilizers. The conversion to the particular color occurs in the same manner as described above.

Water-soluble leuco-substances may also be fixed at the exposed points of the image by tanning, whereupon the soluble leuco-substance at the unexposed or weakly exposed points is removed, for example by acetone, and thereafter the leuco-compounds, which have been fixed by the tanning process, converted into the particular color by a sodium nitrite solution. The well-known ferricyanide bichromate bath or also a tanning developer may be employed for the tanning process.

The method in question is not confined merely to silver salt emulsions. It is, for example, quite possible to produce a picture composed of manganese or iron salts, in which case, of course, conversion of the metallic deposit into a compound capable of undergoing reaction is unnecessary.

According to the invention two or more color pictures may also be produced by super-imposing two or more layers, i. e. applying the layers one above the other, which are each tuned to a certain character of light (wave-length limits) and have the corresponding leuco-substance incorporated therein. In addition to leuco-substances resulting in brilliant colors it is also possible to add to the emulsions leuco-substances providing a black or similar color on the lines of four-colour print. Use will naturally be made of corresponding sensibilizers and filter colors. Two different emulsions may be applied to the front and rear side of a film respectively. Alternatively, two or more different emulsions may be combined by "re-emulsion". According to this process at first complementary color negatives, or negatives containing the correct colors but permutated black and white, are produced, which may be copied on to a similar material, for example from film on to film, or plate on to film, or plate and film on to paper. It is, however, also possible to make copies on copying material prepared according to this process from any desired source, such as color diapositive, color screen plate, color tracing, etc.

The process according to the invention also permits of combination with the known photographic coloring processes, more particularly in those cases in which the silver compound is converted into those chemical substances which, in addition to the purpose of converting the leuco-compounds into the particular color, are also adapted for fixing colors or for tanning the gelatine, etc. For example, the lead chromate according to the first example described in the above is converted into lead sulphate, whereby an oxidizing process is caused by reason of the chromic acid released, and the lead sulphate is coloured with a basic dye, for example fuchsin. This particular method will be found to offer advantages for subsequent correction of the coloring.

It will be understood that no restriction is made to the specific examples above referred to and that various modifications are quite possible within the meaning of the description and the annexed claims without departing from the spirit of the invention.

What I claim as new and desire to secure by Letters Patent is:

1. A method of producing colored photographic images which comprises adding a durable leuco compound of vat dyestuffs to a light-sensitive metallic salt emulsion layer, exposing the layer, developing the latent silver image and fixing in the customary manner and then treating the layer with an oxidizing agent.

2. A method of producing colored photographic images which comprises adding esters of leuco compounds of vat dyestuffs to a sensitized metallic salt emulsion, performing exposure, developing and fixing in the customary manner, and then treating the exposed, developed and fixed image with an agent acting on the said compound and converting the said compound into the color at the desired points.

3. The method of producing colored photographic images which comprises adding ester salts of leuco compounds of vat dyestuffs to a sensitized metallic salt emulsion, performing exposure, developing and fixing in the customary manner and then treating the exposed, developed and fixed image with an agent acting on the said compound and converting the said compound into the color at the desired points.

4. A method of producing colored photographic images which comprises adding ethers of leuco compounds of vat dyestuffs to a sensitized metallic salt emulsion, performing exposure, developing and fixing in the customary manner and then treating the exposed, developed and fixed image with an agent acting on the said compound and converting the said compound into the color at the desired points.

5. A method of producing colored photographic images which comprises adding a durable leuco compound of vate dyestuffs to a sensitized metallic salt emulsion, performing exposure, developing and fixing in the customary manner and then introducing the exposed, developed and fixed image into a bath converting the said image into a compound acting on the said leuco compound, thereby producing the color at the desired points by interaction with the said leuco compound.

6. A method of producing colored photographic images, which comprises adding a durable leuco compound of vat dyestuffs to a sensitized metallic salt emulsion, performing exposure, developing and fixing in the customary manner, and then introducing the image into a bath and converting the exposed, developed and fixed metallic salt into a compound rich in oxygen, and liberating oxidizing agents at subsequent treatment, thereby producing the desired color by oxidation of the said leuco compound.

7. A method of producing color photographic images, which comprises adding a durable leuco compound of vat dyestuffs to a sensitized metallic salt emulsion, performing exposure, developing and fixing in the customary manner, and then introducing the exposed, developed and fixed image into a bath rich in oxygen, thereby producing the desired color by interaction between the said compound, the metallic deposit and the said oxygeneous bath.

8. A method of producing color photographic images which comprises adding a stable vat dyestuff forming substance to a sensitized metallic salt emulsion, performing exposure, developing and fixing the image into a bath, converting the metallic deposit into a condensing agent, and then introducing the said image into a second bath thereby producing the desired color by condensation.

9. A method of producing color photographic images, which comprises adding a stable vat dyestuff forming substance to a sensitized metallic salt emulsion, performing exposure, developing and fixing in the customary manner, introducing the exposed, developed and fixed image into a bath, converting the metal deposit into a reducing agent and then introducing the said image into a second bath thereby producing the desired color by reduction.

10. A method of producing colored photographic images which comprises adding a stable vat dyestuff forming substance to a sensitized metallic salt emulsion, performing exposure, developing and fixing in the customary manner, introducing the exposed, developed and fixed image into a bath, thereby converting the metal deposit into a catalyzing agent, and then introducing the said image into a second bath thereby producing the desired color by catalyzation.

11. A method of producing colored photographic images, which comprises adding a durable leuco compound of vat dyestuffs to a sensitized metallic salt emulsion, performing exposure, developing and fixing in the customary manner, introducing the exposed, developed and fixed image into a bath acting on the said compound and converting the said compound into the desired color and subjecting the picture after the color formation to a photographic toning process of the known kind.

12. A method of producing colored photographic images, according to claim 1, which comprises adding the said leuco compound after production of the sensitized emulsion and prior to development.

13. A method of producing colored photographic images, according to claim 1, which comprises adding the said leuco compound after production of the sensitized emulsion and following development.

14. A method of producing colored photographic images, according to claim 1, which comprises adding the said leuco compound after production of the sensitized emulsion and prior to development by impregnation.

15. A method of producing colored photographic images, according to claim 1, which comprises adding the said leuco compound after production of the sensitized emulsion and following development by impregnation.

16. A method of producing colored photographic images, according to claim 1, which comprises adding the said leuco compound after production of the sensitized emulsion and prior to development by impression.

17. A method of producing colored photographic images, according to claim 1, which comprises adding the said leuco compound after production of the sensitized emulsion and following development by impression.

18. A method of producing colored photographic images, according to claim 1, which comprises adding the said leuco compound after production of the sensitized emulsion and prior to development by application thereof in the form of a coating.

19. A method of producing colored photographic images, according to claim 1 which comprises adding the said leuco compound after production of the sensitized emulsion and following development by application thereof in the form of a coating.

20. A method of producing colored photographic images, which comprises adding a durable leuco compound of vat dyestuffs to a metallic salt emulsion, performing exposure, developing and fixing in the customary manner, and then converting the said compound into the desired color in one single bath.

21. A method of producing colored photographic images which comprises adding a stable vat dyestuff forming substance to a light sensitive metallic salt emulsion layer, exposing the layer, developing the latent silver image and fixing in the customary manner, and then treating the layer by a vat dyestuff forming bath.

22. A photographic material for producing colored images, comprising a sensitized metallic sale emulsion and a durable leuco compound of a vat dyestuff.

23. A photographic material for producing colored images comprising a sensitized metallic salt emulsion and an ester of a leuco compound of vat dyestuffs.

24. A photographic material for producing colored images comprising a sensitized metallic salt emulsion and a salt of an ester of a leuco compound of vat dyestuffs.

25. A photographic material for producing colored images comprising a sensitized metallic salt emulsion and an ether of a leuco compound of vat dystuffs.

26. A photographic material for producing colored images comprising a sensitized metallic salt emulsion containing a substance of the class consisting of esters, ester-salts and ethers of a leuco compound of a vat dyestuff.

27. A photographic material for producing colored images comprising a sensitized metallic salt emulsion and a water insoluble durable leuco compound of a vat dyestuff.

BÉLA GÁSPÁR.

CERTIFICATE OF CORRECTION

Reissue No. 21,513. July 23, 1940.

BELA GASPAR.

It is hereby certified that error appears in the printed specification of the above numbered patent requiring correction as follows: Page 3, first column, line 32, claim 5, for "vate" read --vat--; page 4, first column, line 8, claim 22, for the word "sale" read --salt--; and that the said Letters Patent should be read with this correction therein that the same may conform to the record of the case in the Patent Office.

Signed and sealed this 10th day of September, A. D. 1940.

Leslie Frazer, (Seal) Acting Commissioner of Patents.